United States Patent
Jung

(10) Patent No.: US 9,298,265 B2
(45) Date of Patent: Mar. 29, 2016

(54) DEVICE, METHOD, AND STORAGE MEDIUM STORING PROGRAM FOR DISPLAYING A PAUSED APPLICATION

(71) Applicant: KYOCERA CORPORATION, Kyoto-shi, Kyoto (JP)

(72) Inventor: Haeseung Jung, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 135 days.

(21) Appl. No.: 13/684,307

(22) Filed: Nov. 23, 2012

(65) Prior Publication Data
US 2013/0139107 A1    May 30, 2013

(30) Foreign Application Priority Data

Nov. 25, 2011 (JP) ................................ 2011-257518
Nov. 22, 2012 (JP) ................................ 2012-256155

(51) Int. Cl.
| | |
|---|---|
| H04B 1/38 | (2015.01) |
| G06F 3/0481 | (2013.01) |
| G06F 3/01 | (2006.01) |
| G06F 3/0488 | (2013.01) |
| G06F 3/0482 | (2013.01) |

(52) U.S. Cl.
CPC .............. *G06F 3/017* (2013.01); *G06F 3/0482* (2013.01); *G06F 3/0488* (2013.01); *G06F 3/04817* (2013.01)

(58) Field of Classification Search
CPC .............................. G06F 3/017; G06F 3/04817
USPC .......... 715/761, 767, 764, 835; 345/211, 173; 345/339; 455/566; 700/284
See application file for complete search history.

(56) References Cited

U.S. PATENT DOCUMENTS

| | | | |
|---|---|---|---|
| 5,874,958 A * | 2/1999 | Ludolph ....................... 715/781 |
| 6,965,398 B2 * | 11/2005 | Arakt ......................... 348/211.3 |
| 7,461,348 B2 * | 12/2008 | Clow et al. .................... 715/767 |
| 7,479,949 B2 * | 1/2009 | Jobs et al. .................... 345/173 |
| 8,484,100 B2 * | 7/2013 | Feldman et al. ............. 705/27.1 |
| 8,564,544 B2 * | 10/2013 | Jobs et al. .................... 345/173 |
| 2007/0050722 A1 * | 3/2007 | Schulz et al. ................. 715/764 |
| 2008/0165160 A1 | 7/2008 | Kocienda et al. |
| 2009/0315867 A1 * | 12/2009 | Sakamoto et al. ............ 345/184 |
| 2009/0327318 A1 * | 12/2009 | Peacock ........................ 707/100 |
| 2010/0317406 A1 * | 12/2010 | Shigeta ......................... 455/566 |
| 2010/0321289 A1 * | 12/2010 | Kim et al. ..................... 345/156 |
| 2011/0252378 A1 * | 10/2011 | Anzures et al. ............... 715/835 |
| 2012/0227007 A1 * | 9/2012 | Nicholson et al. ............ 715/779 |
| 2012/0327061 A1 * | 12/2012 | Sirpal et al. .................. 345/211 |
| 2013/0080944 A1 * | 3/2013 | Reeves et al. ................. 715/761 |
| 2013/0173070 A1 * | 7/2013 | Tennyson et al. ............. 700/284 |

FOREIGN PATENT DOCUMENTS

WO     2008086302 A1     7/2008

* cited by examiner

*Primary Examiner* — Jennifer To
*Assistant Examiner* — Jasmine Wan
(74) *Attorney, Agent, or Firm* — Hauptman Ham, LLP

(57) ABSTRACT

According to an aspect, a device includes a touch screen display and a controller. When a predetermined gesture is detected through the touch screen display, a controller displays a paused application which is pausing an editing process.

8 Claims, 15 Drawing Sheets

FIG.6

| Date | Time | Application | Screen Image | Edited Data |
|---|---|---|---|---|
| 2011/11/15 | 11:08 | Mail application | xxxxx.png | TO: xxx@example.com<br>SUBJECT: Hello<br>It was fun yesterday.<br>Next week, |
| 2011/11/15 | 11:26 | SMS application | yyyyy.png | TO: YAMADA Hanako<br>Right on schedule, I'll |

9Y

DEVICE, METHOD, AND STORAGE MEDIUM STORING PROGRAM FOR DISPLAYING A PAUSED APPLICATION

CROSS-REFERENCE TO RELATED APPLICATIONS

This application claims priority from Japanese Application No. 2011-257518, filed on Nov. 25, 2011, and Japanese Application No. 2012-256155, filed on Nov. 22, 2012, the contents of which are incorporated by reference herein in their entireties.

BACKGROUND

1. Technical Field

The present application relates to a device, a method, and a storage medium storing therein a program. More particularly, the present application relates to a device including a touch screen display, a method of controlling the device, and a storage medium storing therein a program for controlling the device.

2. Description of the Related Art

A touch screen device having a touch screen display has been known. Examples of the touch screen devices include, but are not limited to, a smartphone and a tablet. The touch screen device detects a gesture of a finger, a pen, or a stylus pen through the touch screen. Then, the touch screen device operates according to the detected gesture. An example of the operation according to the detected gesture is described in, for example, International Publication Pamphlet No. 2008/086302.

The basic operation of the touch screen device is implemented by an operating system (OS) built into the device. Examples of the OS built into the touch screen device include, but are not limited to, Android, BlackBerry OS, iOS, Symbian OS, and Windows Phone.

The touch screen device is used in various situations. Therefore, an editing process being executed by the touch screen device may sometimes be interrupted for some reason. For the foregoing reasons, there is a need for a device, a method, and a program that support the user in restarting the interrupted editing process.

SUMMARY

According to an aspect, a device includes a touch screen display and a controller. When a predetermined gesture is detected through the touch screen display, a controller displays a paused application which is pausing an editing process.

According to another aspect, a method is for controlling a device with a touch screen display. The method includes: starting an application which executes an editing process of data; pausing the editing process; detecting a predetermined gesture through the touch screen display; and when the predetermined gesture is detected, displaying a paused application which is pausing an editing process.

According to another aspect, a non-transitory storage medium stores a program. When executed by a device with a touch screen display, the program causes the device to execute: starting an application which executes an editing process of data; pausing the editing process; detecting a predetermined gesture through the touch screen display; and when the predetermined gesture is detected, displaying a paused application which is pausing an editing process.

BRIEF DESCRIPTION OF THE DRAWINGS

FIG. 6 is a diagram illustrating an example of an interruption management DB.

DETAILED DESCRIPTION

Exemplary embodiments of the present invention will be explained in detail below with reference to the accompanying drawings. A smartphone will be explained below as an example of a device provided with a touch screen display.

Figure 1:
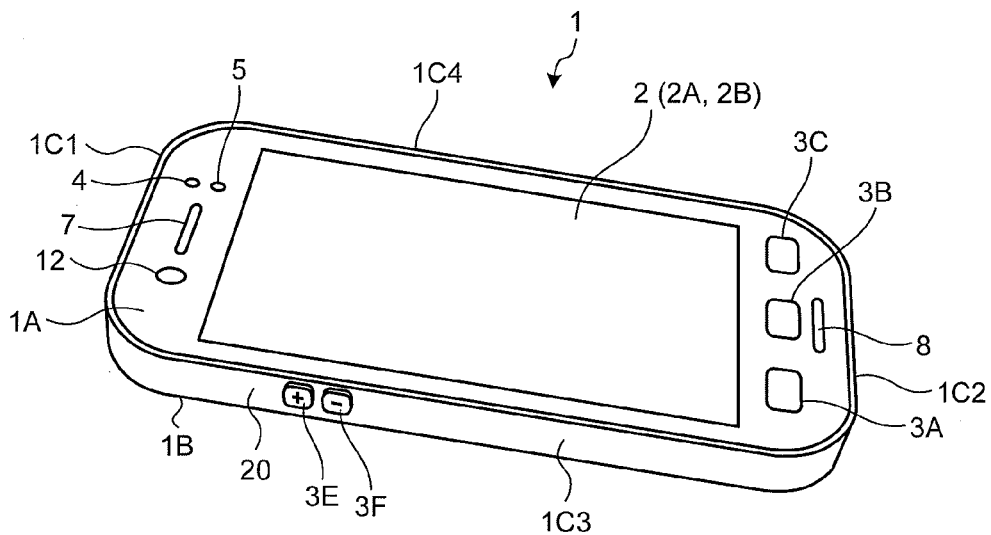
FIG. 1 is a perspective view of a smartphone according to an embodiment.
Figure 2:
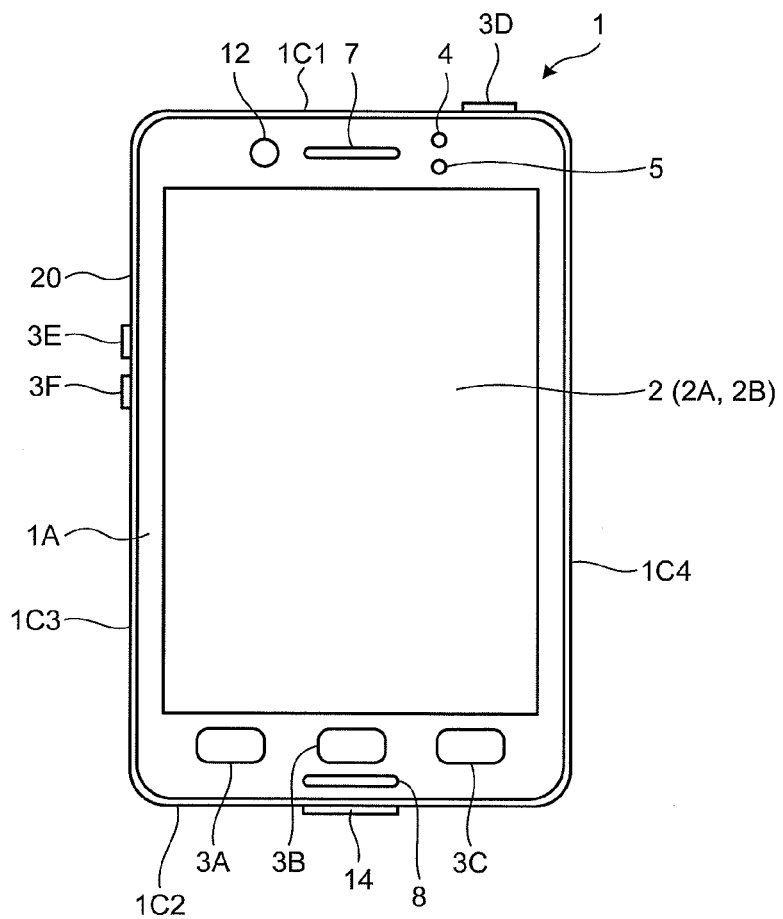
FIG. 2 is a front view of the smartphone.
Figure 3:
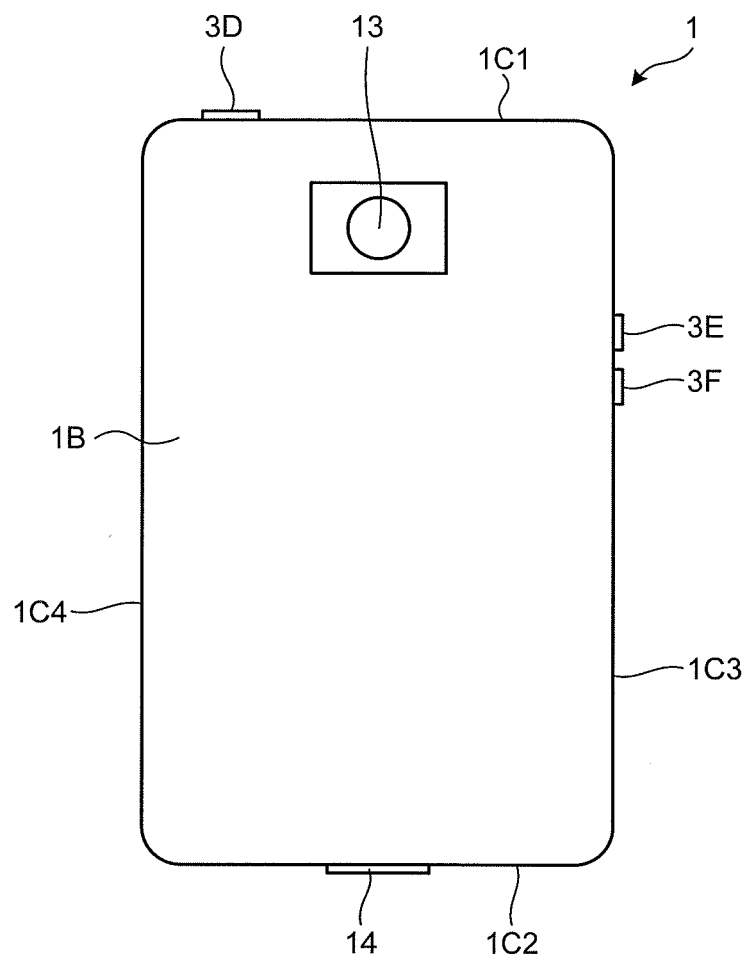
FIG. 3 is a back view of the smartphone.

An overall configuration of a smartphone 1 according to an embodiment will be explained below with reference to FIG. 1 to FIG. 3. As illustrated in FIG. 1 to FIG. 3, the smartphone 1 includes a housing 20. The housing 20 includes a front face 1A, a back face 1B, and side faces 1C1 to 1C4. The front face 1A is a front of the housing 20. The back face 1B is a back of the housing 20. The side faces 1C1 to 1C4 are sides each connecting the front face 1A and the back face 1B. Hereinafter, the side faces 1C1 to 1C4 may be collectively called "side face 1C" without being specific to any of the side faces.

The smartphone 1 includes a touch screen display 2, buttons 3A to 3C, an illumination (ambient light) sensor 4, a proximity sensor 5, a receiver 7, a microphone 8, and a camera 12, which are provided in the front face 1A. The smartphone 1 includes a camera 13, which is provided in the back face 1B. The smartphone 1 includes buttons 3D to 3F and a connector 14, which are provided in the side face 1C. Hereinafter, the buttons 3A to 3F may be collectively called "button 3" without being specific to any of the buttons.

The touch screen display 2 includes a display 2A and a touch screen 2B. In the example of FIG. 1, each of the display 2A and the touch screen 2B is approximately rectangular-shaped; however, the shapes of the display 2A and the touch screen 2B are not limited thereto. Each of the display 2A and the touch screen 2B may have any shape such as a square, a circle or the like. In the example of FIG. 1, the display 2A and the touch screen 2B are arranged in a superimposed manner; however, the manner in which the display 2A and the touch screen 2B are arranged is not limited thereto. The display 2A and the touch screen 2B may be arranged, for example, side by side or apart from each other. In the example of FIG. 1, longer sides of the display 2A are along with longer sides of the touch screen 2B respectively while shorter sides of the display 2A are along with shorter sides of the touch screen 2B respectively; however, the manner in which the display 2A and the touch screen 2B are superimposed is not limited thereto. In case the display 2A and the touch screen 2B are arranged in the superimposed manner, they can be arranged such that, for example, one or more sides of the display 2A are not along with any sides of the touch screen 2B.

The display 2A is provided with a display device such as a liquid crystal display (LCD), an organic electro-luminescence display (OELD), or an inorganic electro-luminescence display (IELD). The display 2A displays text, images, symbols, graphics, and the like.

The touch screen 2B detects a contact of a finger, a pen, a stylus pen, or the like on the touch screen 2B. The touch screen 2B can detect positions where a plurality of fingers, pens, stylus pens, or the like make contact with the touch screen 2B. In the description herein below, a finger, pen, stylus pen, and the like may be referred to as a "contact object" or an "object".

The detection method of the touch screen 2B may be any detection methods, including but not limited to, a capacitive type detection method, a resistive type detection method, a surface acoustic wave type (or ultrasonic type) detection method, an infrared type detection method, an electro magnetic induction type detection method, and a load sensing type detection method. In the description herein below, for the sake of simplicity, it is assumed that the user uses his/her finger(s) to make contact with the touch screen 2B in order to operate the smartphone 1.

The smartphone 1 determines a type of a gesture based on at least one of a contact detected by the touch screen 2B, a position where the contact is detected, a change of a position where the contact is detected, an interval between detected contacts, and the number of detection times of the contact. The gesture is an operation performed on the touch screen 2B. Examples of the gestures determined by the smartphone 1 include, but are not limited to, touch, long touch, release, swipe, tap, double tap, long tap, drag, flick, pinch in, and pinch out.

"Touch" is a gesture in which a finger makes contact with the touch screen 2B. The smartphone 1 determines a gesture in which the finger makes contact with the touch screen 2B as touch. "Long touch" is a gesture in which a finger makes contact with the touch screen 2B for longer than a given time. The smartphone 1 determines a gesture in which the finger makes contact with the touch screen 2B for longer than a given time as long touch.

"Release" is a gesture in which a finger separates from the touch screen 2B. The smartphone 1 determines a gesture in which the finger separates from the touch screen 2B as release. "Swipe" is a gesture in which a finger moves on the touch screen 2B with continuous contact thereon. The smartphone 1 determines a gesture in which the finger moves on the touch screen 2B with continuous contact thereon as swipe.

"Tap" is a gesture in which a touch is followed by a release. The smartphone 1 determines a gesture in which a touch is followed by a release as tap. "Double tap" is a gesture such that a gesture in which a touch is followed by a release is successively performed twice. The smartphone 1 determines a gesture such that a gesture in which a touch is followed by a release is successively performed twice as double tap.

"Long tap" is a gesture in which a long touch is followed by a release. The smartphone 1 determines a gesture in which a long touch is followed by a release as long tap. "Drag" is a gesture in which a swipe is performed from an area where a movable-object is displayed. The smartphone 1 determines a gesture in which a swipe is performed from an area where the movable-object displayed as drag.

"Flick" is a gesture in which a finger separates from the touch screen 2B while moving after making contact with the touch screen 2B. That is, "Flick" is a gesture in which a touch is followed by a release accompanied with a movement of the finger. The smartphone 1 determines a gesture in which the finger separates from the touch screen 2B while moving after making contact with the touch screen 2B as flick. The flick is performed, in many cases, with a finger moving along one direction. The flick includes "upward flick" in which the finger moves upward on the screen, "downward flick" in which the finger moves downward on the screen, "rightward flick" in which the finger moves rightward on the screen, and "leftward flick" in which the finger moves leftward on the screen, and the like. Movement of the finger during the flick is, in many cases, quicker than that of the finger during the swipe.

"Pinch in" is a gesture in which a swipe with a plurality of fingers is performed in a direction to move the fingers toward each other. The smartphone 1 determines a gesture in which the distance between a position of one finger and a position of another finger detected by the touch screen 2B becomes shorter as pinch in. "Pinch out" is a gesture in which a swipe with a plurality of fingers is performed in a direction to move the fingers away from each other. The smartphone 1 determines a gesture in which the distance between a position of one finger and a position of another finger detected by the touch screen 2B becomes longer as pinch out.

In the description herein below, a gesture performed by using a finger may be referred to as a "single touch gesture", and a gesture performed by using a plurality of fingers may be referred to as a "multi touch gesture". Examples of the multi touch gesture include a pinch in and a pinch out. A tap, a flick, a swipe, and the like are a single touch gesture when performed by using a finger, and are a multi touch gesture when performed by using a plurality of fingers.

The smartphone 1 performs operations according to these gestures which are determined through the touch screen 2B. Therefore, user-friendly and intuitive operability is achieved. The operations performed by the smartphone 1 according to the determined gestures may be different depending on the screen displayed on the display 2A. In the following explanation, for the sake of simplicity of explanation, the fact that the touch screen detects the contact(s) and then the smartphone determines the type of the gesture as X based on the contact(s) may be simply described as "the smartphone detects X" or "the controller detects X".

Figure 4:
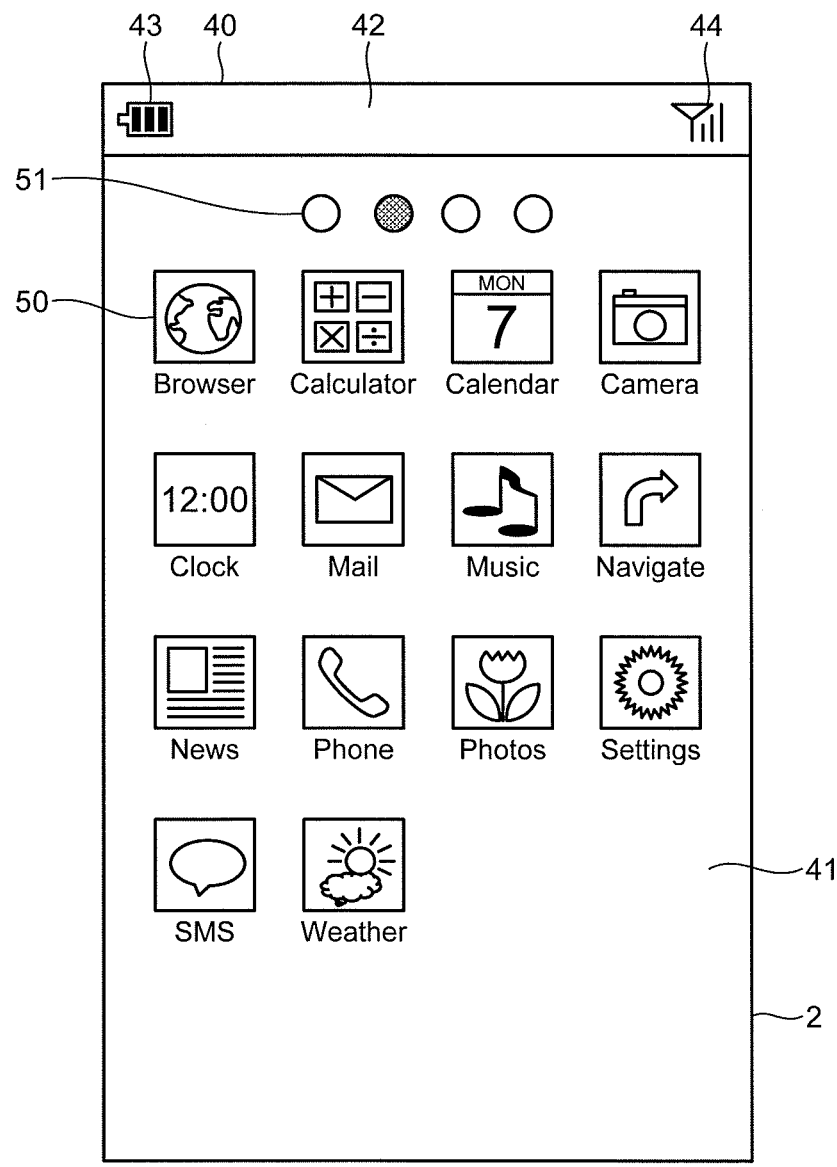
FIG. 4 is a diagram illustrating an example of a home screen.

An example of the screen displayed on the display 2A will be explained below with reference to FIG. 4. FIG. 4 represents an example of a home screen. The home screen may also be called "desktop", "standby screen", "idle screen", or "standard screen". The home screen is displayed on the display 2A. The home screen is a screen allowing the user to select which one of applications (programs) installed in the smartphone 1 is executed. The smartphone 1 executes the application selected on the home screen in the foreground. The screen of the application executed in the foreground is displayed on the display 2A.

Icons can be arranged on the home screen of the smartphone 1. A plurality of icons 50 are arranged on a home screen 40 illustrated in FIG. 4. Each of the icons 50 is previously associated with an application installed in the smartphone 1. When detecting a gesture for an icon 50, the smartphone 1 executes the application associated with the icon 50 for which the gesture is detected. For example, when detecting a tap on an icon 50 associated with a mail application, the smartphone 1 executes the mail application.

The icons 50 include an image and a character string. The icons 50 may contain a symbol or a graphic instead of an image. The icons 50 do not have to include either one of the image and the character string. The icons 50 are arranged based on a layout pattern. A wall paper 41 is displayed behind the icons 50. The wall paper may sometimes be called "photo screen", "back screen", "idle image", or "background image". The smartphone 1 can use an arbitrary image as the wall paper 41. The smartphone 1 may be configured so that the user can select an image to be displayed as the wall paper 41.

The smartphone 1 can include a plurality of home screens. The smartphone 1 determines, for example, the number of home screens according to setting by the user. The smartphone 1 displays a selected one on the display 2A even if there is a plurality of home screens.

The smartphone 1 displays an indicator (a locator) 51 on the home screen. The indicator 51 includes one or more symbols. The number of the symbols is the same as that of the home screens. In the indicator 51, a symbol corresponding to a home screen that is currently displayed is displayed in a different manner from that of symbols corresponding to the other home screens.

The indicator 51 in an example illustrated in FIG. 4 includes four symbols. This means the number of home screens is four. According to the indicator 51 in the example illustrated in FIG. 4, the second symbol from the left is displayed in a different manner from that of the other symbols. This means that the second home screen from the left is currently displayed.

The smartphone 1 can change a home screen to be displayed on the display 2A. When a gesture is detected while displaying one of home screens, the smartphone 1 changes the home screen to be displayed on the display 2A to another one. For example, when detecting a rightward flick, the smartphone 1 changes the home screen to be displayed on the display 2A to a home screen on the left side. For example, when detecting a leftward flick, the smartphone 1 changes the home screen to be displayed on the display 2A to a home screen on the right side. The smartphone 1 changes the home screen to be displayed on the display 2A from a first home screen to a second home screen, when a gesture is detected while displaying the first home screen, such that the area of the first home screen displayed on the display 2A gradually becomes smaller and the area of the second home screen displayed gradually becomes larger. The smartphone 1 may switch the home screens such that the first home screen is instantly replaced by the second home screen.

An area 42 is provided along the top edge of the display 2A. Displayed on the area 42 are a remaining mark 43 indicating a remaining amount of a power supply and a radio-wave level mark 44 indicating an electric field strength of radio wave for communication. The smartphone 1 may display time, weather, an application during execution thereof, a type of communication system, a status of a phone call, a mode of the device, an event occurring in the device, and the like in the area 42. In this manner, the area 42 is used to inform the user of various notifications. The area 42 may be provided on any screen other than the home screen 40. A position where the area 42 is provided is not limited to the top edge of the display 2A.

The home screen 40 illustrated in FIG. 4 is only an example, and therefore the configuration of each of elements, the arrangement of the elements, the number of home screens 40, the way to perform each of operations on the home screen 40, and the like do not have to be like the above mentioned explanation.

Figure 5:
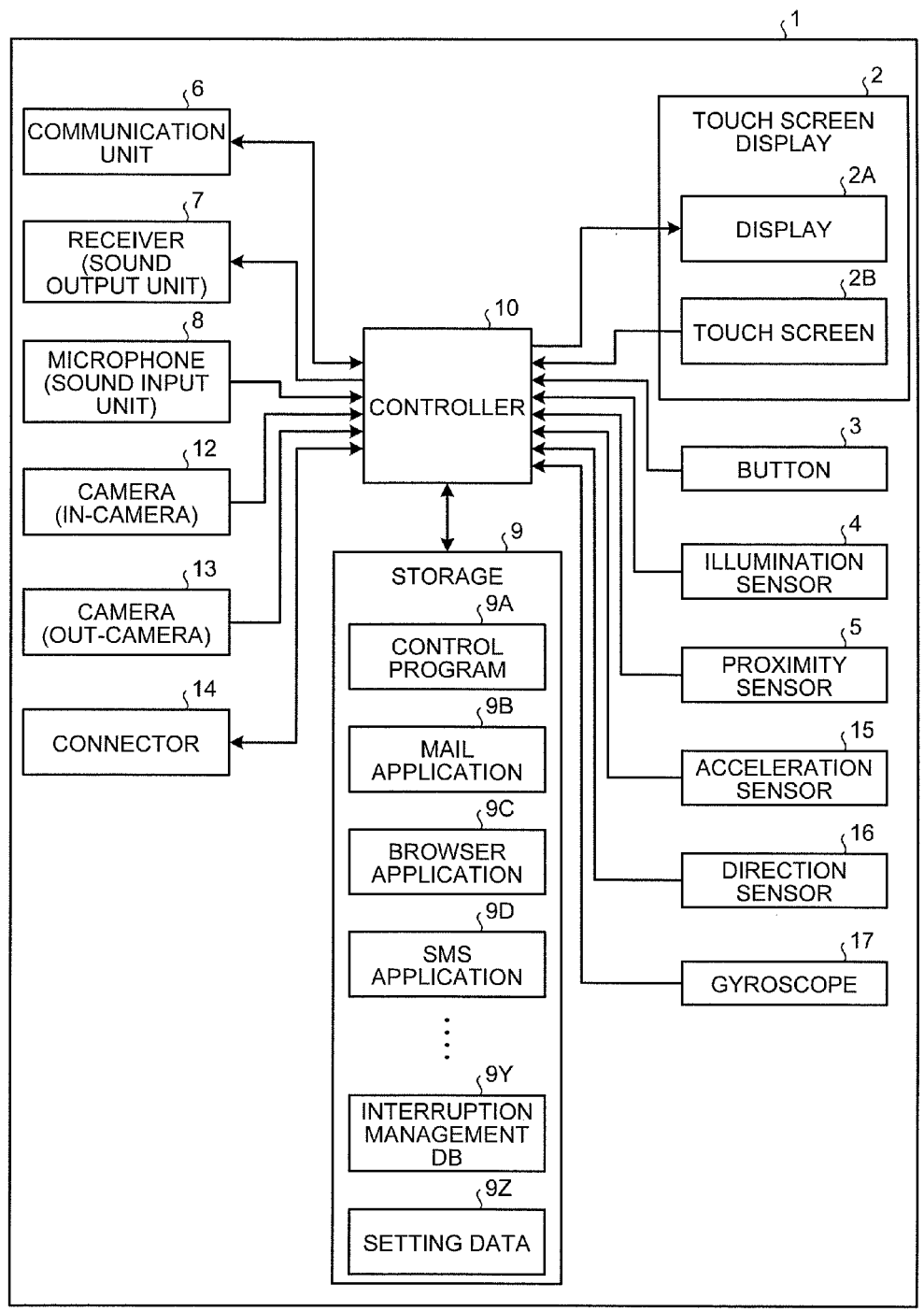
FIG. 5 is a block diagram of functions of the smartphone.

FIG. 5 is a block diagram of the smartphone 1. The smartphone 1 includes the touch screen display 2, the button 3, the illumination sensor 4, the proximity sensor 5, a communication unit 6, the receiver 7, the microphone 8, a storage 9, a controller 10, the cameras 12 and 13, the connector 14, an acceleration sensor 15, a direction (orientation) sensor 16, and a gyroscope 17.

The touch screen display 2 includes, as explained above, the display 2A and the touch screen 2B. The display 2A displays text, images, symbols, graphics, or the like. The touch screen 2B detects contact(s). The controller 10 detects a gesture performed for the smartphone 1. Specifically, the controller 10 detects an operation (a gesture) for the touch screen 2B in cooperation with the touch screen 2B.

The button 3 is operated by the user. The button 3 includes buttons 3A to 3F. The controller 10 detects an operation for the button 3 in cooperation with the button 3. Examples of the operations for the button 3 include, but are not limited to, a click, a double click, a triple click, a push, and a multi-push.

The buttons 3A to 3C are, for example, a home button, a back button, or a menu button. The button 3D is, for example, a power on/off button of the smartphone 1. The button 3D may function also as a sleep/sleep release button. The buttons 3E and 3F are, for example, volume buttons.

The illumination sensor 4 detects illumination of the ambient light of the smartphone 1. The illumination indicates intensity of light, lightness, or brightness. The illumination sensor 4 is used, for example, to adjust the brightness of the display 2A. The proximity sensor 5 detects the presence of a nearby object without any physical contact. The proximity sensor 5 detects the presence of the object based on a change of the magnetic field, a change of the return time of the reflected ultrasonic wave, etc. The proximity sensor 5 detects that, for example, the touch screen display 2 is brought close to someone's face. The illumination sensor 4 and the proximity sensor 5 may be configured as one sensor. The illumination sensor 4 can be used as a proximity sensor.

The communication unit 6 performs communication via radio waves. A communication system supported by the communication unit 6 is wireless communication standard. The wireless communication standard includes, for example, a communication standard of cellar phones such as 2G, 3G, and 4G. The communication standard of cellar phones includes, for example, Long Term Evolution (LTE), Wideband Code Division Multiple Access (W-CDMA), CDMA 2000, a Personal Digital Cellular (PDC), a Global System for Mobile Communications (GSM), and a Personal Handy-phone System (PHS). The wireless communication standard further includes, for example, Worldwide Interoperability for Microwave Access (WiMAX), IEEE 802.11, Bluetooth, Infrared Data Association (IrDA), and Near Field Communication (NFC). The communication unit 6 may support one or more communication standards.

The receiver 7 is a sound output unit. The receiver 7 outputs a sound signal transmitted from the controller 10 as sound.

The receiver 7 is used, for example, to output voice of the other party on the phone. The microphone 8 is a sound input unit. The microphone 8 converts speech of the user or the like to a sound signal and transmit the converted signal to the controller 10. The smartphone 1 may be provided with a speaker instead of, or in addition to, the receiver 7.

The storage 9 stores therein programs and data. The storage 9 is used also as a work area that temporarily stores a processing result of the controller 10. The storage 9 may include any non-transitory storage medium such as a semiconductor storage medium and a magnetic storage medium. The storage 9 may include a plurality type of storage mediums. The storage 9 may include a combination of a portable storage medium such as a memory card, an optical disc, or a magneto-optical disc with a reader of the storage medium. The storage 9 may include a storage device used as a temporary storage area such as Random Access Memory (RAM).

The storage 9 stores therein, for example, a control program 9A, a mail application 9B, a browser application 9C, an SMS application 9D, an interruption management DB 9Y, and setting data 9Z. The mail application 9B provides an e-mail function for composing, transmitting, receiving, and displaying e-mail, and the like. The browser application 9C provides a WEB browsing function for displaying WEB pages. The SMS application 9D provides a function for composing, transmitting, receiving, and displaying a message using short message service (SMS), and the like. The interruption management database (DB) 9Y contains information related to data of which the editing process is interrupted (paused). The setting data 9Z contains information related to various settings on the operations of the smartphone 1.

The control program 9A provides a function regarding various controls for operating the smartphone 1. The control program 9A controls, for example, the communication unit 6, the receiver 7, and the microphone 8 to make a phone call. The function provided by the control program 9A includes a function for saving information related to data of which the editing process is interrupted (paused), and a function for restarting (resuming) the editing process. The function provided by the control program 9A can be used in combination with a function provided by the other program such as the mail application 9B.

The controller 10 is a processing unit. Examples of the processing units include, but are not limited to, a Central Processing Unit (CPU), System-on-a-chip (SoC), a Micro Control Unit (MCU), and a Field-Programmable Gate Array (FPGA). The controller 10 integrally controls the operations of the smartphone 1 to implement various functions.

Specifically, the controller 10 executes instructions contained in the program stored in the storage 9 while referring to the data stored in the storage 9 as necessary. The controller 10 controls a function unit according to the data and the instructions to thereby implement the various functions. Examples of the function units include, but are not limited to, the display 2A, the communication unit 6, and the receiver 7. The controller 10 can change the control of the function unit according to the detection result of a detector. Examples of the detectors include, but are not limited to, the touch screen 2B, the button 3, the illumination sensor 4, the proximity sensor 5, the microphone 8, the camera 12, the camera 13, the acceleration sensor 15, the direction sensor 16, and the gyroscope 17.

The controller 10 executes, for example, the control program 9A to perform various controls, such as a control for saving information related to data of which the editing process is interrupted, and a control for restarting the editing process.

The camera 12 is an in-camera for photographing an object facing the front face 1A. The camera 13 is an out-camera for photographing an object facing the back face 1B.

The connector 14 is a terminal to which other device is connected. The connector 14 may be a general-purpose terminal such as a Universal Serial Bus (USB), a High-Definition Multimedia Interface (HDMI), Light Peak (Thunderbolt), and an earphone/microphone connector. The connector 14 may be a dedicated terminal such as a dock connector. Examples of the devices connected to the connector 14 include, but are not limited to, an external storage device, a speaker, and a communication device.

The acceleration sensor 15 detects a direction and a magnitude of acceleration applied to the smartphone 1. The direction sensor 16 detects a direction of geomagnetism. The gyroscope 17 detects an angle and an angular velocity of the smartphone 1. The detection results of the acceleration sensor 15, the direction sensor 16, and the gyroscope 17 are used in combination with each other in order to detect a position of the smartphone 1 and a change of its attitude.

Part or all of the programs and the data stored in the storage 9 in FIG. 5 may be downloaded from any other device through communication by the communication unit 6. Part or all of the programs and the data stored in the storage 9 in FIG. 5 may be stored in the non-transitory storage medium that can be read by the reader included in the storage 9. Part or all of the programs and the data stored in the storage 9 in FIG. 5 may be stored in the non-transitory storage medium that can be read by a reader connected to the connector 14. Examples of the non-transitory storage mediums include, but are not limited to, an optical disc such as CD, DVD, and Blu-ray, a magneto-optical disc, magnetic storage medium, a memory card, and solid-state storage medium.

The configuration of the smartphone 1 illustrated in FIG. 5 is only an example, and therefore it can be modified as required within a scope that does not depart from the gist of the present invention. For example, the number and the type of the button 3 are not limited to the example of FIG. 5. The smartphone 1 may be provided with buttons of a numeric keypad layout or a QWERTY layout and so on as buttons for operation of the screen instead of the buttons 3A to 3C. The smartphone 1 may be provided with only one button to operate the screen, or with no button. In the example of FIG. 5, the smartphone 1 is provided with two cameras; however, the smartphone 1 may be provided with only one camera or with no camera. In the example of FIG. 5, the smartphone 1 is provided with three types of sensors in order to detect its position and attitude; however, the smartphone 1 does not have to be provided with some of the sensors. Alternatively, the smartphone 1 may be provided with any other type of sensor for detecting at least one of the position and the attitude.

The interruption management DB 9Y will be explained in more detail below with reference to FIG. 6. FIG. 6 is a diagram illustrating an example of the interruption management DB 9Y. As illustrated in FIG. 6, the interruption management DB 9Y has items such as Date, Time, Application, Screen Image, and Edited Data; and stores therein information for each data of which the editing process is interrupted. The item of Date stores therein a date on which the editing process is interrupted. The item of Time stores therein a time at which the editing process is interrupted. The item of Application stores therein information for specifying an application to be executed in order to restart the editing process. The item of Screen Image stores therein a file name of an image of an editing screen displayed on the display 2A when the editing process is interrupted, or stores therein the image itself. The item of Edited Data stores therein a file name of data being edited when the editing process is interrupted, or stores therein the data itself.

Figure 7:
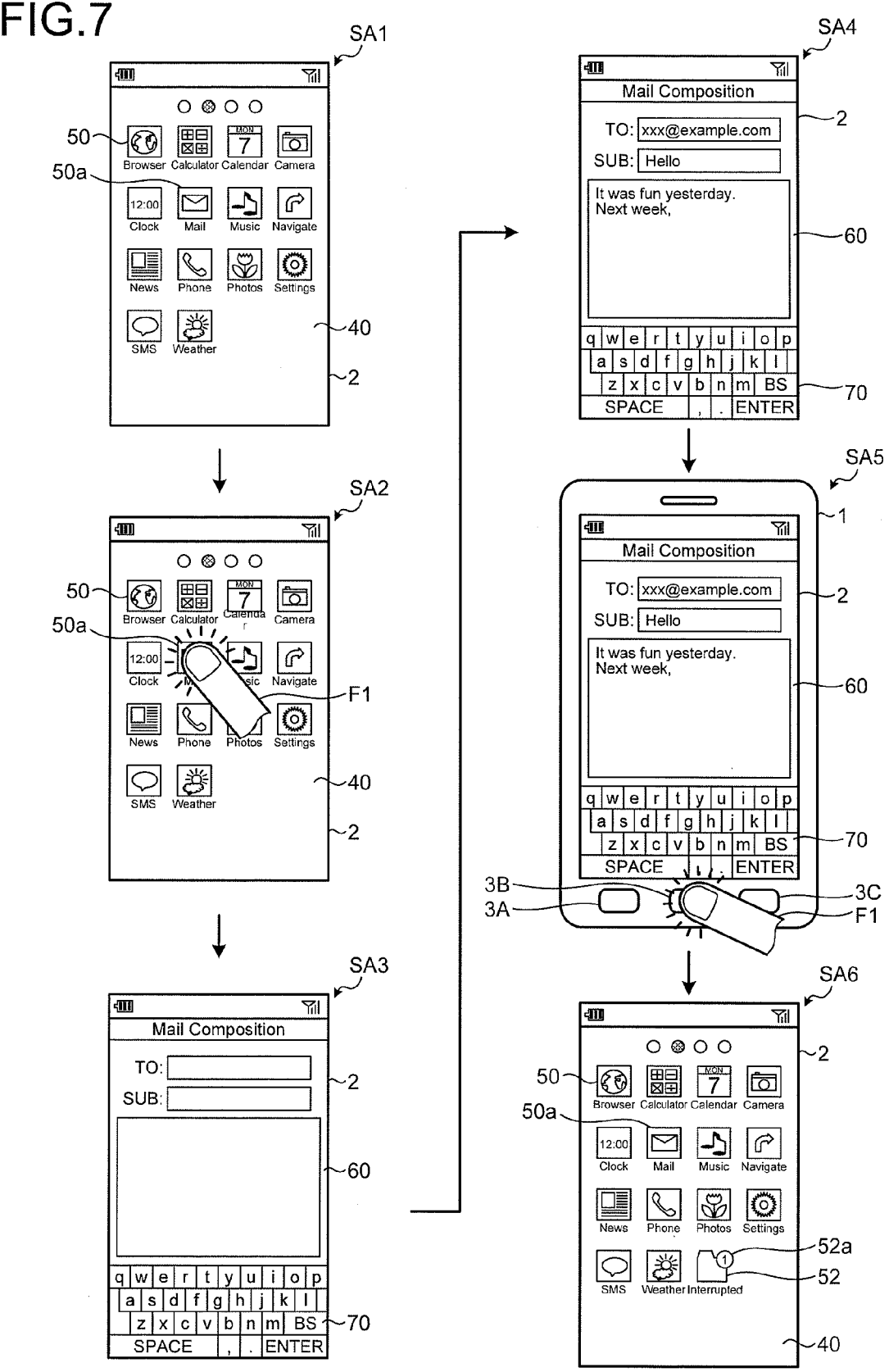
FIG. 7 is a diagram illustrating an operation example of the smartphone when an editing process is interrupted by a user operation.

An operation example of the smartphone 1 when an editing process is interrupted will be explained below with reference to FIG. 7 and FIG. 8. FIG. 7 is a diagram illustrating an operation example of the smartphone 1 when an editing process is interrupted by a user operation. At Step SA1 in FIG. 7, the home screen 40 the same as that of FIG. 4 is displayed on the display 2A. At Step SA2, the user taps the finger F1 on an icon 50a.

When the tap on the icon 50 is detected through the touch screen 2B, the smartphone 1 executes an application corresponding to the tapped icon 50. The icon 50a corresponds to the mail application 9B. Therefore, at Step SA3, the smartphone 1 executes the mail application 9B, and displays a mail composition screen 60 provided by the mail application 9B on the display 2A. The mail composition screen 60 is a screen where an editing process for entering address, subject, body, and so on of an e-mail is performed. Displayed below the mail composition screen 60 is a virtual keyboard 70 for entering characters.

At Step SA4, the editing process based on the user operation goes halfway. Specifically, an entry of address and subject of an e-mail is completed, and its body is partially entered. At this time, if the user wants to perform some other operation for some reason, then as illustrated at Step SA5, he/she performs a predetermined operation to interrupt the editing process. The predetermined operation to interrupt the editing process is, for example, an operation of pressing any one of the buttons 3.

When the predetermined operation to interrupt the editing process is detected, the smartphone 1 interrupts (pauses) the editing process and closes the screen for the editing process. Consequently, as illustrated at Step SA6, the home screen 40 is displayed on the display 2A instead of the mail composition screen 60. Furthermore, the smartphone 1 acquires information related to the data being edited when the editing process is interrupted, and stores the information in the interruption management DB 9Y. Information to be stored in the interruption management DB 9Y at this time is, for example, the information in the first line of the interruption management DB 9Y illustrated in FIG. 6.

To indicate that the information is stored in the interruption management DB 9Y, the smartphone 1 places an interrupted-state icon 52 on the home screen 40. In the example of FIG. 7, although the interrupted-state icon 52 has an appearance like a folder, the appearance of the interrupted-state icon 52 is not limited thereto.

Added to the interrupted-state icon 52 is a mini-icon 52a indicating the number of pieces of information stored in the interruption management DB 9Y. At Step SA6, the mini-icon 52a including a number "1" is added to the interrupted-state icon 52. This number indicates that one piece of information is stored in the interruption management DB 9Y. The number of pieces of information stored in the interruption management DB 9Y coincides with the number of data of which the editing process is interrupted. Therefore, adding the mini-icon 52a thereto enables the user to easily recognize the number of data of which the editing process is interrupted.

By tapping any of the icons 50 on the home screen 40 displayed at Step SA6, the user can execute a desired process while interrupting the editing process of the data.

Figure 8:
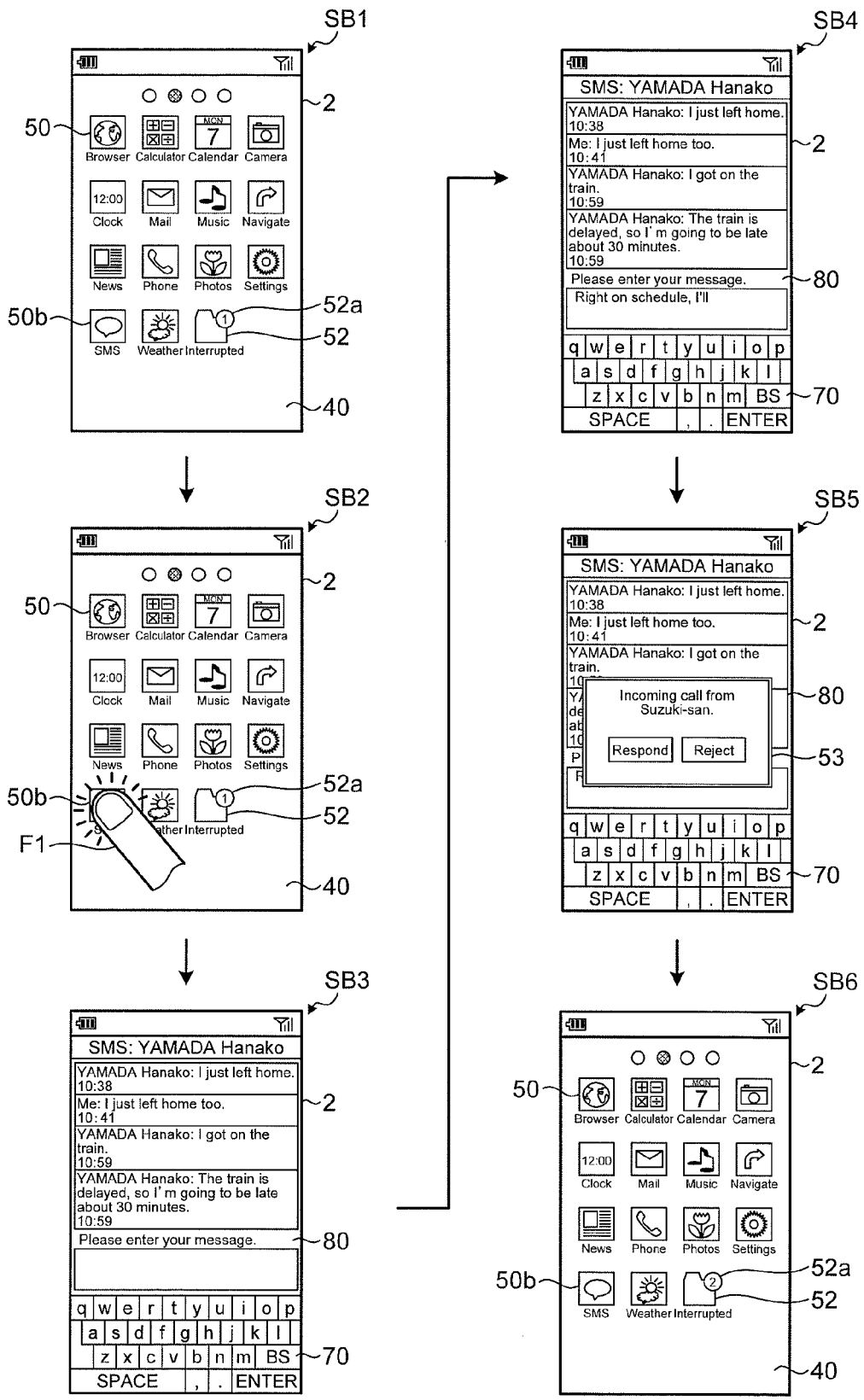
FIG. 8 is a diagram illustrating an operation example of the smartphone when an editing process is interrupted by a notification.

FIG. 8 is a diagram illustrating an operation example of the smartphone 1 when an editing process is interrupted by a notification. At Step SB1 in FIG. 8, the home screen 40 the same as that of Step SA6 in FIG. 7 is displayed on the display 2A. At Step SB2, the user taps the finger F1 on the icon 50b.

The icon 50b corresponds to the SMS application 9D. Therefore, at Step SB3, the smartphone 1 executes the SMS application 9D and displays an SMS screen 80 provided by the SMS application 9D on the display 2A. The SMS screen 80 is a screen on which messages exchanged with a communications partner are displayed and on which editing process for entering a message to be transmitted to the communications partner is performed. Displayed below the SMS screen 80 is the virtual keyboard 70 for entering characters.

At Step SB4, the editing process based on the user operation goes halfway. Specifically, the message is entered halfway. When an incoming call is received at this time, then as illustrated at Step SB5, the smartphone 1 displays a notification screen 53 for notifying an incoming call on the display 2A. In this case, the smartphone 1 may notify the user of the incoming call by further using ring tone, vibration, lighting of a lamp, or the like.

When the user performs an operation for responding to the incoming call on the notification screen 53, the smartphone 1 interrupts the editing process on the SMS screen 80 and closes the screen for the editing process. The smartphone 1 then displays a screen for a phone call on the display 2A. At this time, the smartphone 1 acquires information related to the data being edited at the time of interrupting the editing process, and stores the acquired information in the interruption management DB 9Y. The information stored in the interruption management DB 9Y at this time is, for example, the information in the second line of the interruption management DB 9Y illustrated in FIG. 6.

When the phone call is finished, then, as illustrated at Step SB6, the smartphone 1 displays the home screen 40 on the display 2A. To indicate that there is information stored in the interruption management DB 9Y, the smartphone 1 places the interrupted-state icon 52 on the home screen 40. Added to the interrupted-state icon 52 is the mini-icon 52a indicating the number of pieces of information stored in the interruption management DB 9Y. At Step SB6, the mini-icon 52a including a number "2" is added to the interrupted-state icon 52. This number indicates that two pieces of information are stored in the interruption management DB 9Y.

The example of notifying the incoming call is explained in FIG. 8; however, the smartphone 1 may interrupt the editing process at the time of performing various notifications such as reception of an e-mail, reception of SMS, and arrival of registered scheduled time.

As illustrated in FIG. 7 and FIG. 8, when interrupting the editing process, the smartphone 1 places the interrupted-state icon 52 on the home screen 40. Therefore, the user can easily recognize that the editing process is interrupted, that is, there is data being edited. Moreover, the smartphone 1 adds the mini-icon 52a indicating the number of pieces of information stored in the interruption management DB 9Y to the interrupted-state icon 52. This enables the user to easily recognize the number of data being edited.

Figure 9:
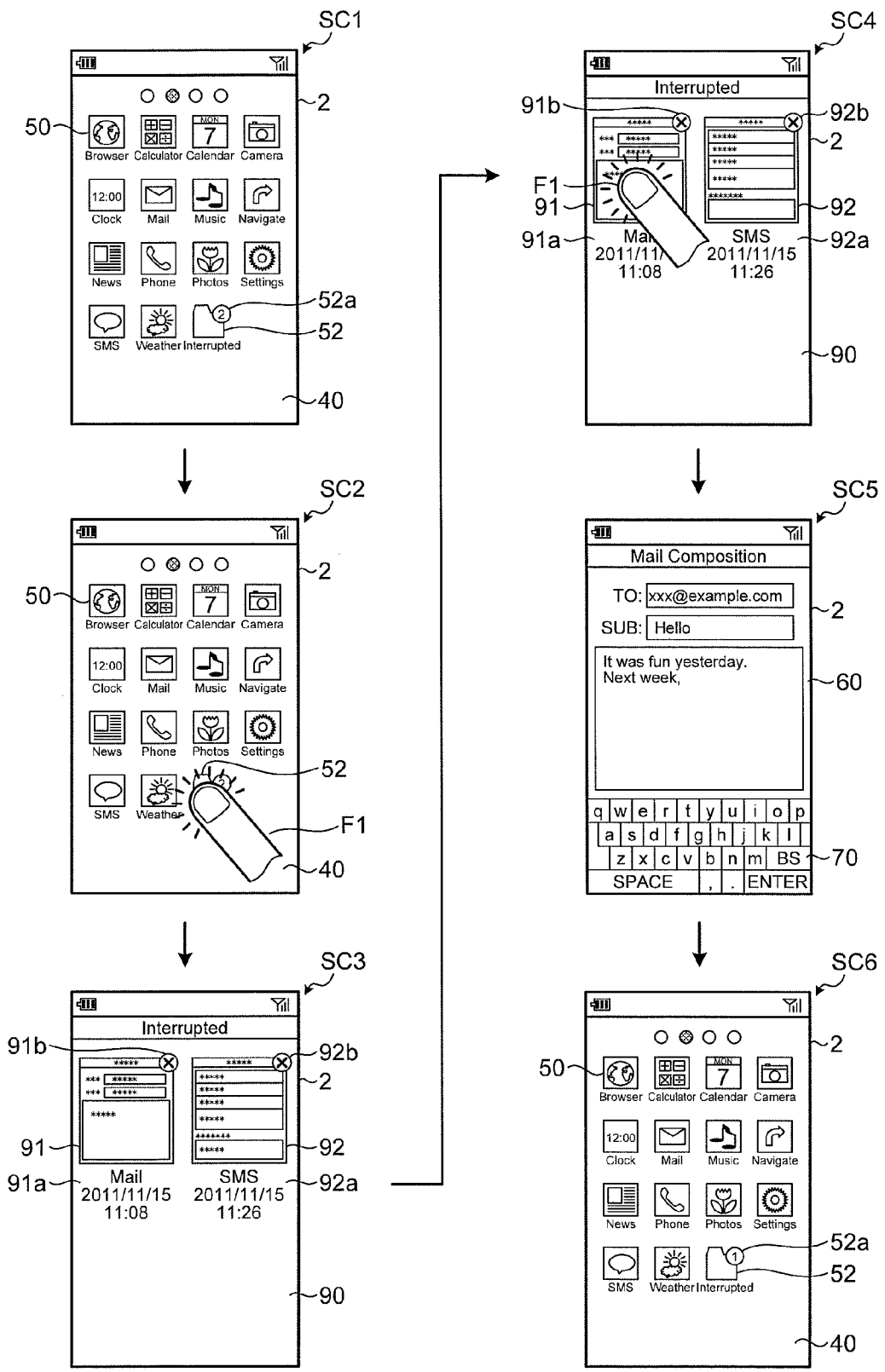
FIG. 9 is a diagram illustrating an operation example of the smartphone when the editing process is restarted.

The interrupted-state icon 52 is also used to restart the interrupted editing process. FIG. 9 is a diagram illustrating an operation example of the smartphone 1 when the editing process is restarted. At Step SC1 in FIG. 9, the home screen 40 the same as that of Step SB6 in FIG. 8 is displayed on the display 2A. At Step SC2, the user taps the finger F1 on the interrupted-state icon 52.

When the tap on the interrupted-state icon 52 is detected through the touch screen 2B, then, as illustrated at Step SC3, the smartphone 1 displays a data list screen 90 on the display 2A. The data list screen 90 displays pieces of information stored in the interruption management DB 9Y. In the example of FIG. 9, a screen image 91 corresponding to the data of which the editing process is interrupted at Step SA5 in FIG. 7 and a screen image 92 corresponding to the data of which the editing process is interrupted at Step SB5 in FIG. 8 are displayed on the data list screen 90.

Each of the screen image 91 and the screen image 92 is the image of the editing screen displayed on the display 2A when editing process is interrupted. Added respectively to the screen image 91 and the screen image 92 are a comment 91a and a comment 92a each including a name of an application to be executed in order to restart the editing process and including date/time on which the editing process is interrupted. Also added respectively to the screen image 91 and the screen image 92 are a delete button 91b and a delete button 92b to delete corresponding information from the interruption management DB 9Y.

At Step SC4, the user taps the finger F1 on the screen image 91. When the tap on the screen image or the comment in the data list screen 90 is detected through the touch screen 2B, the smartphone 1 restarts (resumes) the editing process of corresponding data. Specifically, the smartphone 1 acquires information corresponding to the taped screen image or comment from the interruption management DB 9Y. The smartphone 1 executes an application specified based on the acquired information, and displays the screen which has been displayed when the editing process is interrupted on the display 2A. The smartphone 1 reproduces the state in which Edited Data included in the acquired information appears on the screen.

Because the editing process is restarted, the mail composition screen 60 the same as that before the editing process is interrupted at step SA5 in FIG. 7 is displayed on the display 2A at Step SC5. After the editing process is restarted in this manner, the smartphone 1 deletes the information corresponding to the tapped screen image or comment from the interruption management DB 9Y.

Thereafter, when the editing process is completed and the e-mail is transmitted or stored, the smartphone 1 closes the mail composition screen 60 and displays the home screen 40. Because one piece of information is deleted from the interruption management DB 9Y when the editing process is restarted, as illustrated at Step SC6, the number included in the mini-icon 52a decreases from "2" to "1".

Figure 10:
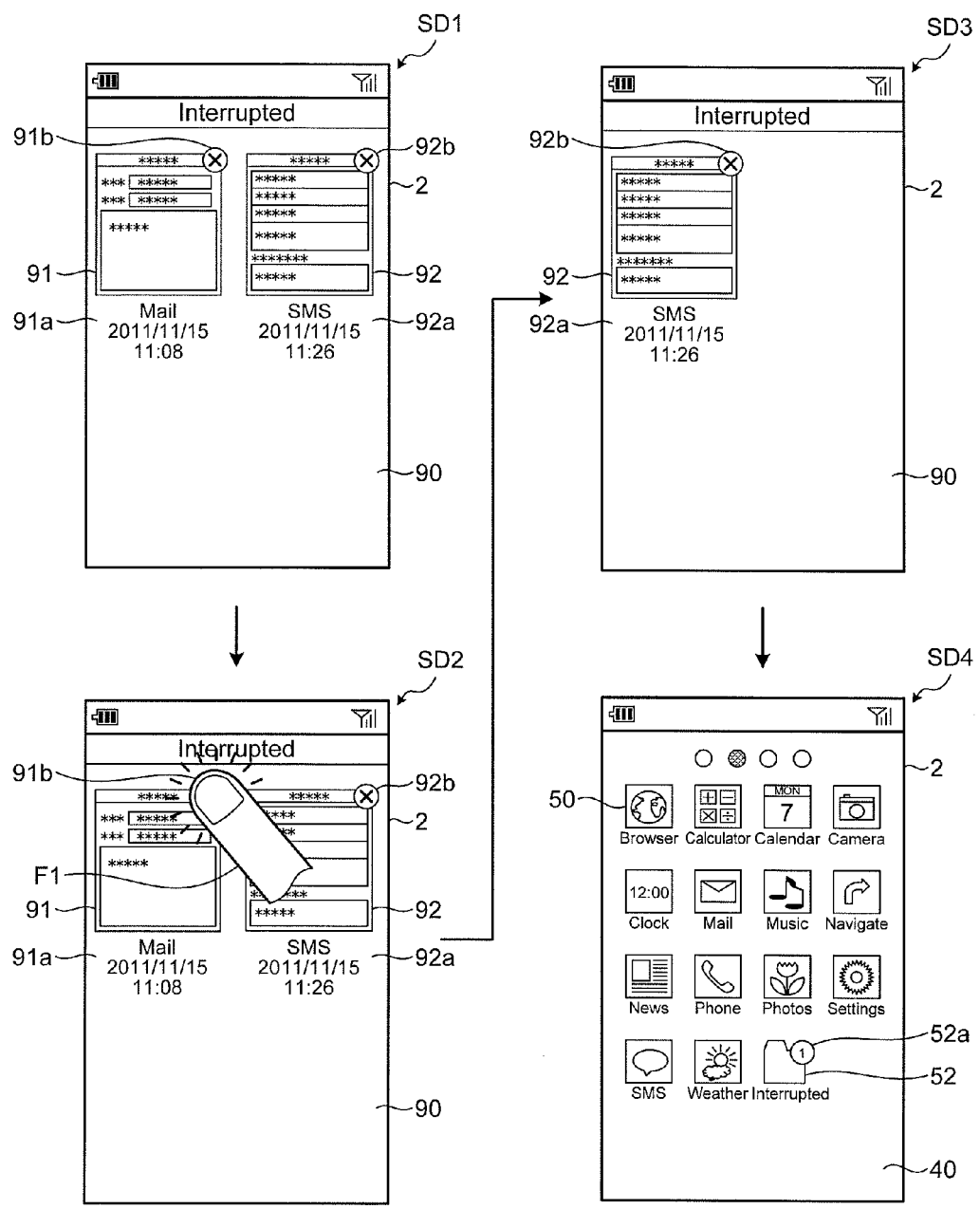
FIG. 10 is a diagram illustrating an operation example of the smartphone when data being edited is discarded without restarting the editing process.

The interrupted-state icon 52 is also used to discard the data being edited without restarting the editing process. FIG. 10 is a diagram illustrating an operation example of the smartphone 1 when the data being edited is discarded without restarting the editing process. At Step SD1 in FIG. 10, the data list screen 90 the same as that of Step SC3 in FIG. 9 is displayed on the display 2A. At Step SD2, the user taps the finger F1 on the delete button 91b added to the screen image 91.

When the tap on the delete button in the data list screen 90 is detected through the touch screen 2B, the smartphone 1 deletes the corresponding information from the interruption management DB 9Y without restarting the editing process. Moreover, the smartphone 1 deletes the tapped delete button and the corresponding screen image and comment from the data list screen 90. At Step SD3, the screen image 91, the comment 91a, and the delete button 91b disappear from the data list screen 90.

Thereafter, when detecting a predetermined operation, the smartphone 1 closes the data list screen 90 and displays the home screen 40. Because one piece of information is deleted from the interruption management DB 9Y when the delete button 91b is tapped, as illustrated at Step SD4, the number included in the mini-icon 52a decreases from "2" to "1".

FIG. 10 depicts the operation for tapping on the delete button as an operation for deleting information from the interruption management DB 9Y; however, the operation for deleting information from the interruption management DB 9Y is not limited thereto. For example, information may be deleted from the interruption management DB 9Y by an operation for dragging an item displayed in the data list screen 90 to an icon such as a trash box. For example, information may also be deleted from the interruption management DB 9Y by an operation for selecting an option of "Delete" from a menu displayed when a long touch is performed on an item displayed in the data list screen 90.

Figure 11:
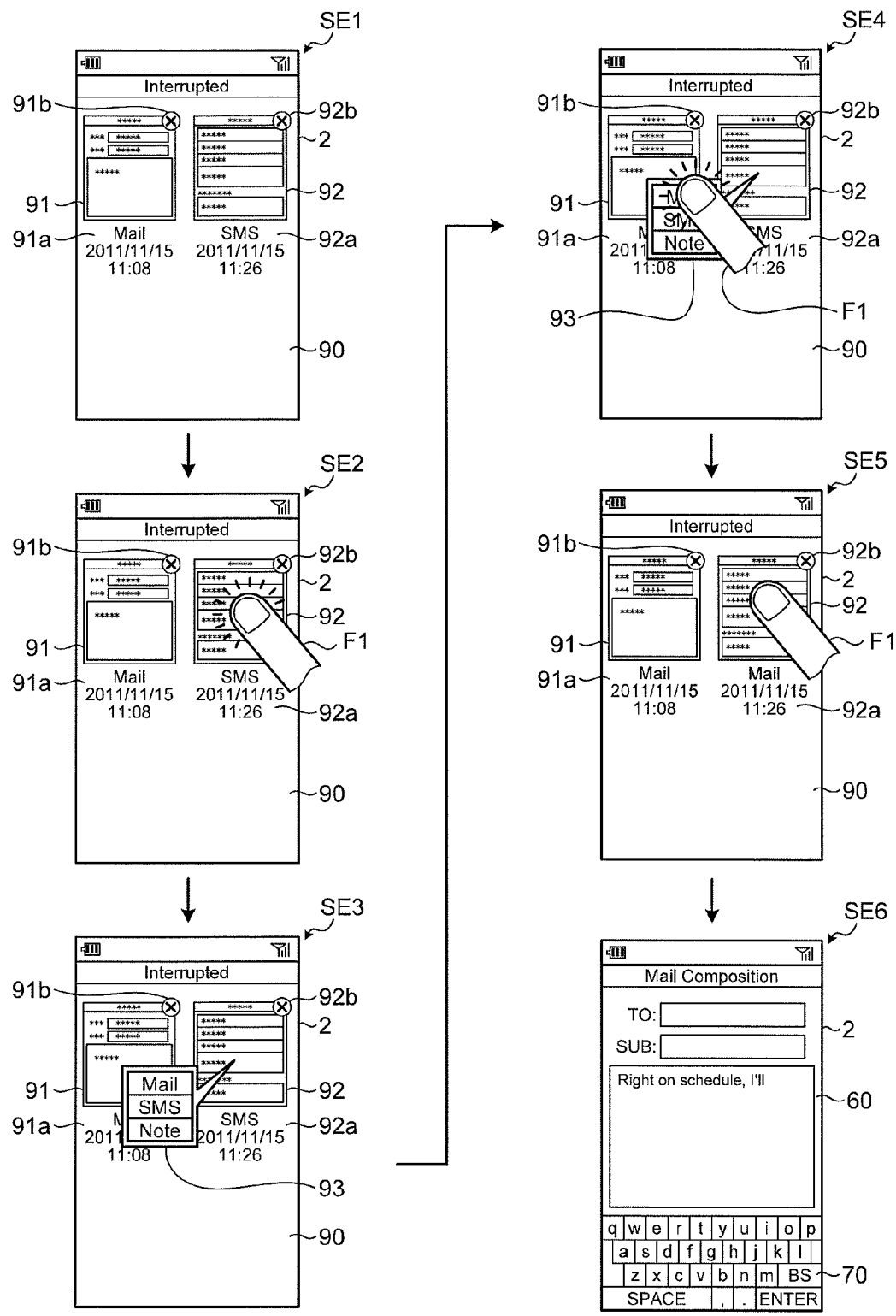
FIG. 11 is a diagram illustrating an operation example of the smartphone when an application to be executed at the time of restarting the editing process is changed.

The smartphone 1 is configured so that the user can change an application to be executed when the editing process is restarted. FIG. 11 is a diagram illustrating an operation example of the smartphone when an application to be executed at the time of restarting the editing process is changed. At Step SE1 in FIG. 11, the data list screen 90 the same as that of Step SC3 in FIG. 9 is displayed on the display 2A. At Step SE2, the user applies a long touch on the screen image 92 using the finger F1.

When the long touch on the screen image or the comment in the data list screen 90 is detected through the touch screen 2B, then, as illustrated at Step SE3, the smartphone 1 displays a pop-up menu 93 on the display 2A. The pop-up menu 93 includes a list of applications capable of editing data being edited corresponding to the screen image or the comment applied with the long touch.

At Step SE4, the user selects "Mail" from the pop-up menu 93 using the finger F1. When the item is selected from the pop-up menu 93, the smartphone 1 updates the interruption management DB 9Y so that the editing process of the data corresponding to the screen image or the comment applied with the long touch is performed by an application corresponding to the selected item. As a result, at Step SE5, the name of the program in the comment 92a added to the screen image 92 is changed from "SMS" to "Mail".

Thereafter, when the user taps the finger F1 on the screen image 92, the smartphone 1 executes the mail application 9B instead of the SMS application 9D. Then, as illustrated at Step SE6, the smartphone 1 displays the mail composition screen 60 on the display 2A. Set in the body of the mail composition screen 60 is the data being edited on the SMS screen 80 when the editing process is interrupted.

In this way, by enabling to change the association between data and an application, the user can use the data input during the editing process for other application. For example, when the user changes his/her mind to send a text by SMS during the editing process for sending the text by e-mail, the user can easily achieve the purpose by interrupting the editing process and changing the association between the data and the application.

The data handled in the editing process may sometimes include a plurality of types of information such as destination mail address, subject, and body in the case of e-mail. How each application after the association is changed handles each information may be determined for each application. For example, the application after the change in the association may be configured so as to restart the editing process using only most important information among multiple pieces of information.

Figure 12:
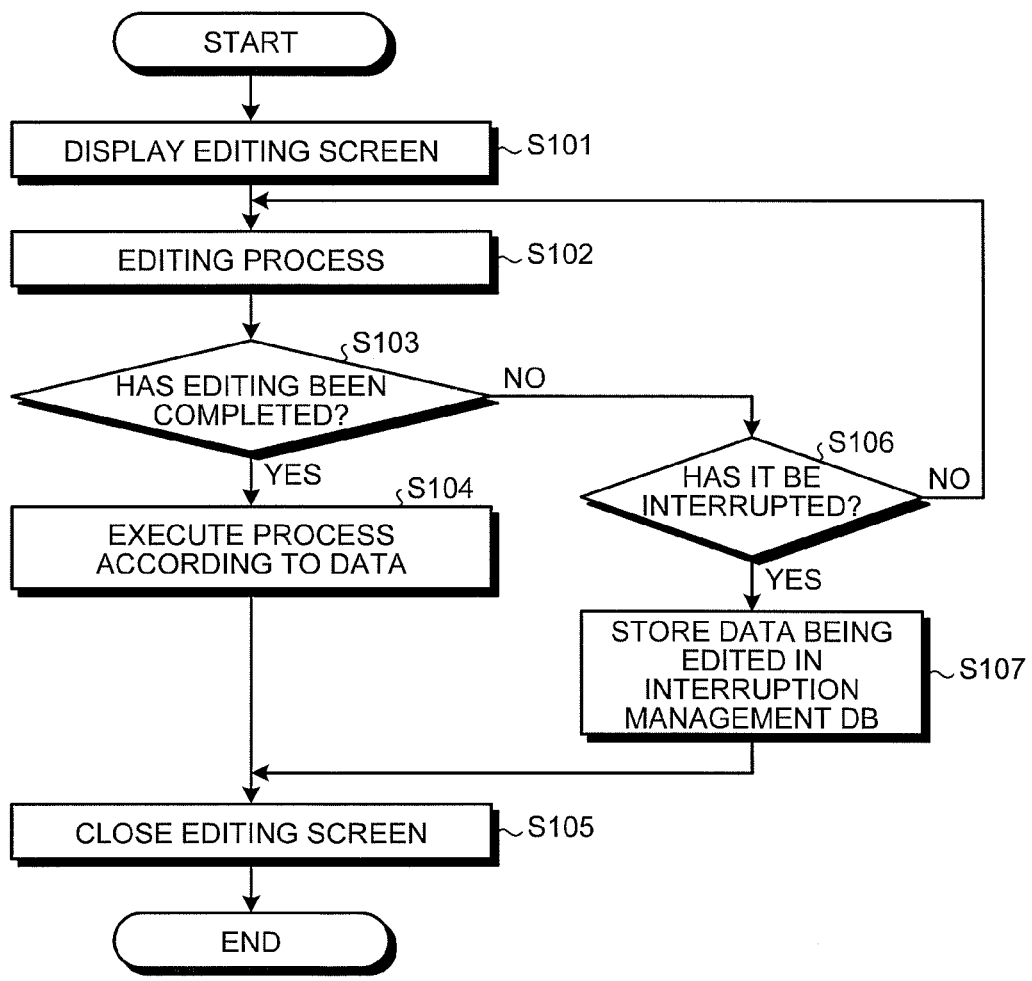
FIG. 12 is a flowchart illustrating a procedure of the editing process.

The procedure, executed by the smartphone 1, related to interruption and restart of the editing process will be explained below with reference to FIG. 12 and FIG. 13. FIG. 12 is a flowchart illustrating the procedure of the editing process. The control illustrated in FIG. 12 is implemented by the controller 10 executing the control program 9A. The procedure in FIG. 12 is executed when the editing process is started or after the editing process is restarted. The controller 10 may sometimes perform other procedure in parallel to the procedure in FIG. 12.

At Step S101, the controller 10 displays the editing screen on the display 2A. Then at Step S102, the controller 10 executes the editing process based on a user operation or so. At Step S103 in the editing process, the controller 10 determines whether the editing has been completed. When the editing has been completed (Yes at Step S103), then at Step S104, the controller 10 executes processes such as saving, transmitting, or reproducing according to the data created by the editing process. At Step S105, the controller 10 closes the editing screen and ends the procedure in FIG. 12.

When the editing has not been completed (No at Step S103), then at Step S106, the controller 10 determines whether the editing process has been interrupted. When the editing process has been interrupted (Yes at Step S106), then at Step S107, the controller 10 stores data being edited and information related to the data in the interruption management DB 9Y. Then at Step S105, the controller 10 closes the editing screen and ends the procedure in FIG. 12.

When the editing process has not been interrupted (No at Step S106), the controller 10 returns to Step S102 and continues the editing process.

Figure 13:
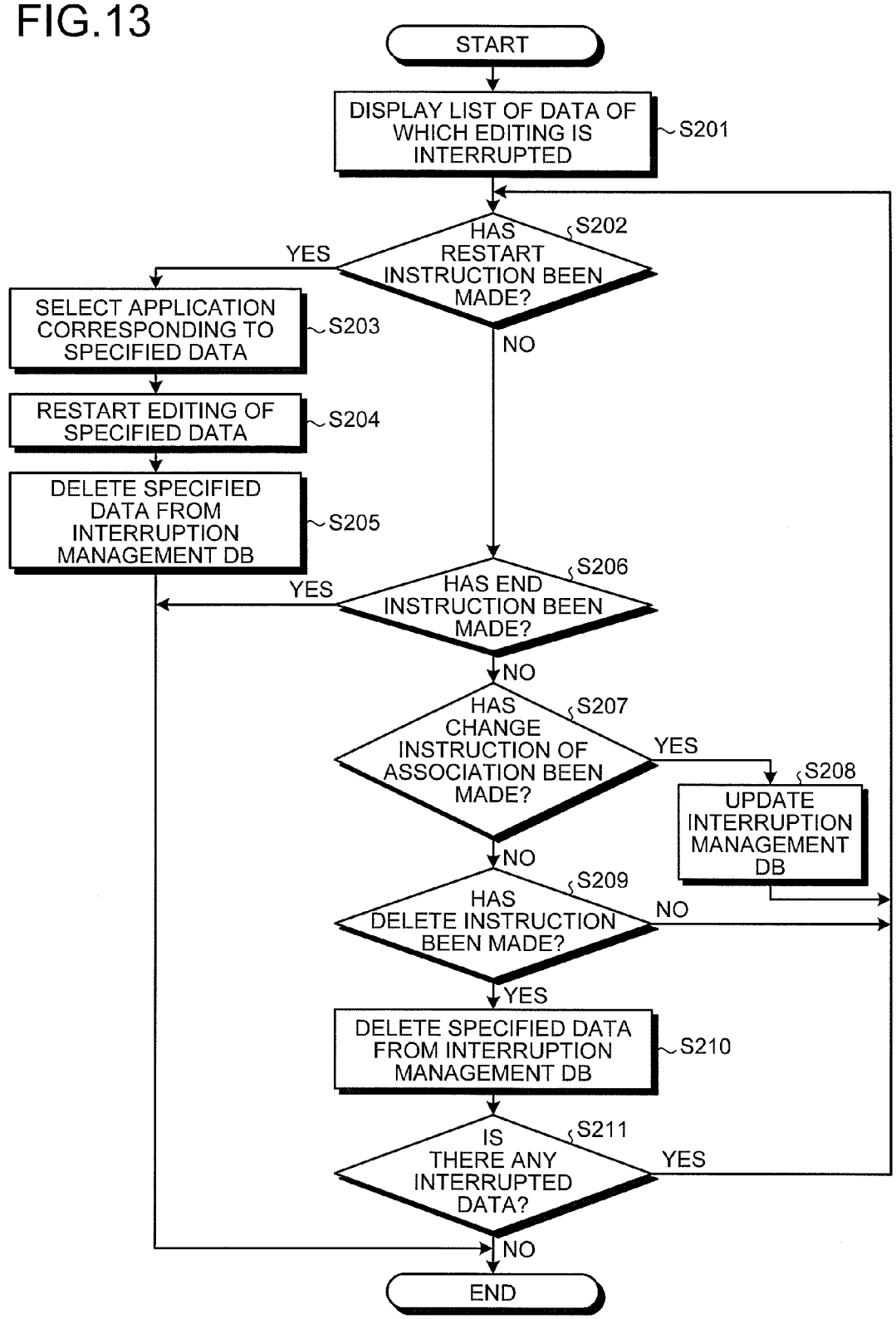
FIG. 13 is a flowchart illustrating a procedure performed when the editing process is restarted.

FIG. 13 is a flowchart illustrating a procedure performed when the editing process is restarted. The control illustrated in FIG. 13 is implemented by the controller 10 executing the control program 9A. The procedure in FIG. 13 is executed when the editing process is restarted. The controller 10 may sometimes perform other procedure in parallel to the procedure in FIG. 13.

At Step S201, the controller 10 refers to the interruption management DB 9Y and displays a list of data of which the editing is interrupted on the display 2A. Subsequently, at Step S202, the controller 10 determines whether a restart instruction of the editing process has been made. The restart instruction of the editing process is made by, for example, an operation of tapping on an item, in the list, corresponding to the data of which the editing process is wished to be restarted.

When the restart instruction of the editing process has been made (Yes at Step S202), then at Step S203, the controller 10 selects an application corresponding to the data specified by the restart instruction. Then at Step S204, the controller 10 restarts the editing process of the data specified by the restart instruction, and deletes the information related to the specified data from the interruption management DB 9Y at Step S205. Thereafter, the controller 10 ends the procedure in FIG. 13.

When the restart instruction of the editing process has not been made (No at Step S202), then at Step S206, the controller 10 determines whether an end instruction has been made. When the end instruction has been made (Yes at Step S206), the controller 10 ends the procedure in FIG. 13.

When the end instruction of the editing process has not been made (No at Step S206), then at Step S207, the controller 10 determines whether a change instruction of the association between the data and the application has been made. When the change instruction of the association has been made (Yes at Step S207), then at Step S208, the controller 10 updates the interruption management DB 9Y so that the editing process of the data is restarted according to the association after the change. Thereafter, the controller 10 re-executes Step S202 and the subsequent steps.

When the change instruction of the association has not been made (No at Step S207), then at Step S209, the controller 10 determines whether a delete instruction of the data has been made. When the delete instruction has not been made (No at Step S209), the controller 10 re-executes Step S202 and the subsequent steps.

When the delete instruction has been made (Yes at Step S209), then at Step S210, the controller 10 deletes the information related to the specified data from the interruption management DB 9Y. Then, at Step S211, the controller 10 determines whether there is any data, of which the editing is interrupted, left in the interruption management DB 9Y. When there is data of which the editing is interrupted left in the interruption management DB 9Y (Yes at Step S211), the controller 10 re-executes Step S202 and the subsequent steps. When there is no data of which the editing is interrupted left in the interruption management DB 9Y (No at Step S211), the controller 10 ends the procedure in FIG. 13.

The embodiment disclosed in the present application can be modified without departing the gist and the scope of the invention. Moreover, the embodiments and their modifications disclosed in the present application can be combined with each other if necessary. For example, the embodiment may be modified as follows.

For example, the programs illustrated in FIG. 5 may be divided into a plurality of modules, or may be combined with any other program.

Figure 14:
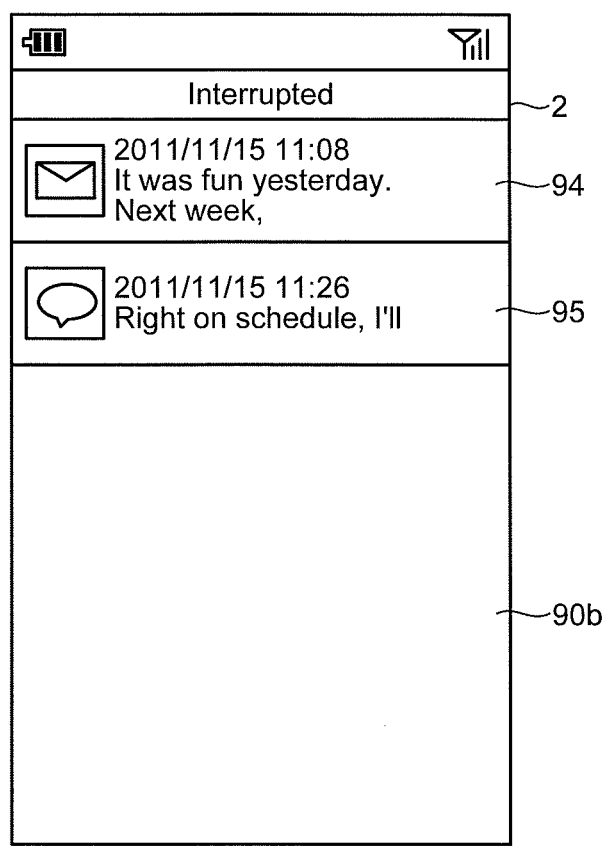
FIG. 14 is a diagram illustrating another example of a data list screen.

The embodiment represents the example of displaying a screen image in the case of displaying the list of data of which the editing is interrupted; however, the way to display the list of the data is not limited thereto. FIG. 14 is a diagram illustrating another example of a data list screen. Displayed on a data list screen 90b in FIG. 14 are items 94 and 95 each including an icon for an application executed in order to restart the editing process, date and time on which the editing process is interrupted, and data of which the editing is interrupted, instead of the screen image. When the tap on the item 94 or 95 is detected through the touch screen 2B, the smartphone 1 restarts the editing process of the data corresponding to the tapped item.

Figure 15:
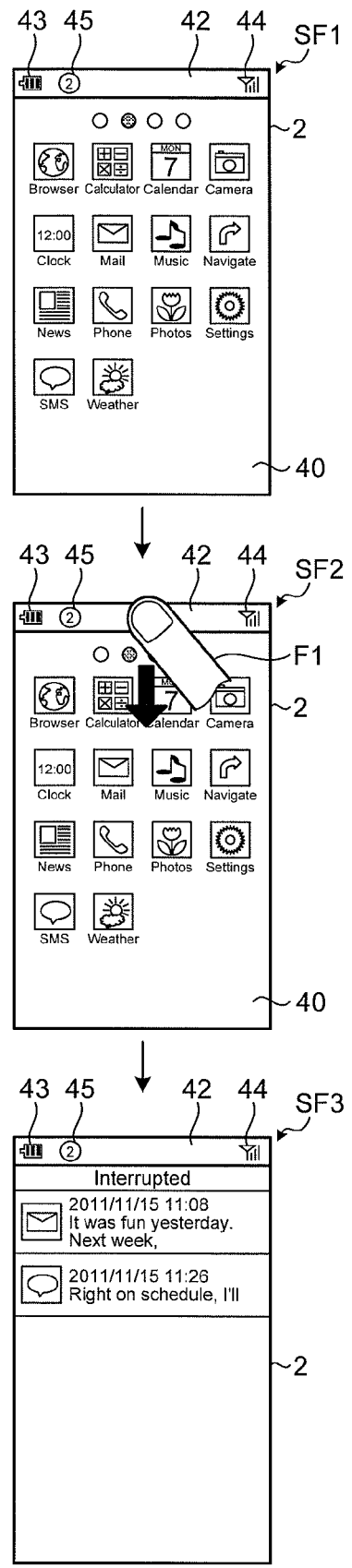
FIG. 15 is a diagram illustrating another example of notifying the user of the presence of data of editing is interrupted.

The embodiment represents the example of notifying the user that there is data of which the editing is interrupted by placing the interrupted-state icon 52 on the home screen 40; however, the way to notify the user that there is data of which the editing is interrupted is not limited thereto. FIG. 15 is a diagram illustrating another example of notifying the user of the presence of data of which the editing is interrupted. At Step SF1 in FIG. 15, an icon 45 appears in the area 42 along the top edge of the home screen 40. The icon 45 includes a number "2". This number indicates that two pieces of information are stored in the interruption management DB 9Y.

The area 42 is provided along the top edge of the display 2A even when any screen other than the home screen 40 is displayed. Therefore, by displaying the number of pieces of information stored in the interruption management DB 9Y in the area 42, this enables the user to recognize the number of data of which the editing is interrupted even if any screen other than the home screen 40 is displayed on the display 2A.

In the case of this example, when wishing to restart the editing process of data, for example, as illustrated at Step SF2, the user swipes the finger F1 downward based on the area 42 as a start point. When detecting such a gesture, as illustrated at Step SF3, the smartphone 1 displays the list of the data of which the editing is interrupted on the display 2A. The list may be displayed in a mode illustrated at Step SC3 in FIG. 9, may be displayed in a mode illustrated in FIG. 14, or may be displayed in any other mode.

Figure 16:
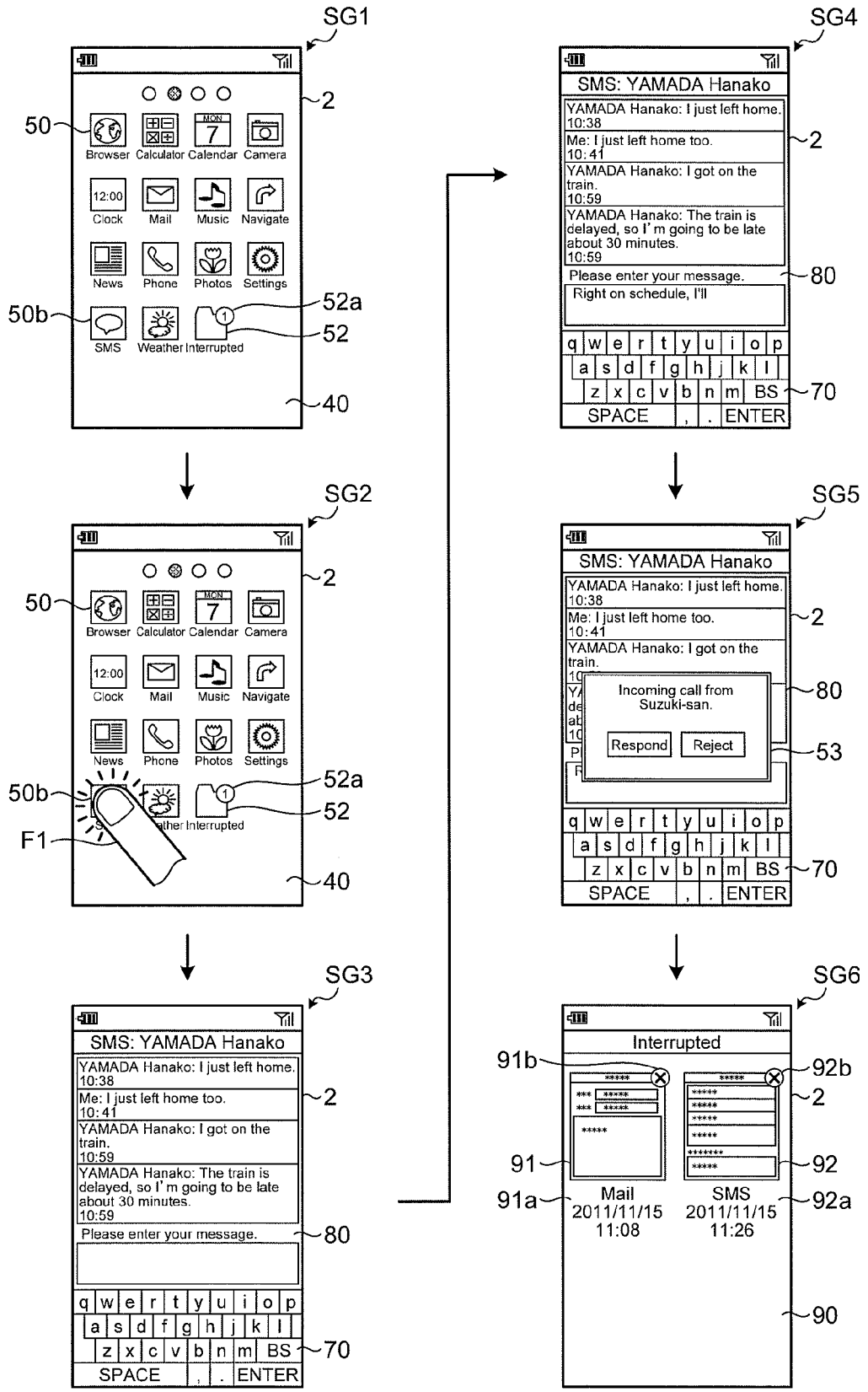
FIG. 16 is a diagram illustrating another operation example of the smartphone when the editing process is interrupted by a notification.

The embodiment represents the example of displaying the home screen 40 after the process by the notification is ended; however, the list of data of which the editing is interrupted may be displayed on the display 2A after the process by the notification is ended. FIG. 16 is a diagram illustrating another operation example of the smartphone 1 when the editing process is interrupted by a notification. Step SG1 to Step SG5 illustrated in FIG. 16 are the same as Step SB1 to Step SB5 illustrated in FIG. 8, and therefore explanation thereof is omitted.

When the phone call started by the notification is finished, as illustrated at Step SG6, the smartphone 1 displays the data list screen 90 on the display 2A. The data list screen 90 may include data interrupted by the notification and also data of which the editing process has previously been interrupted. In this way, by displaying the list of data of which the editing is interrupted after the end of the process started by the notification, this enables the user to surely recognize the presence of the data of which the editing is interrupted.

The embodiment represents the data transmitted through communication as an example of data of which the editing process is interrupted; however, the data of which the editing process is interrupted is not limited thereto. The data of which the editing process is interrupted also includes data stored in the smartphone 1 and used for the process of reproduction or the like such as memo data, image data, moving image data, and music data.

In the embodiment, the smartphone has been explained as an example of the device provided with the touch screen display; however, the device according to the appended claims is not limited to the smartphone. The device according to the appended claims may be a mobile electronic device other than the smartphone. Examples of the mobile electronic devices include, but are not limited to, mobile phones, tablets, mobile personal computers, digital cameras, media players, electronic book readers, navigators, and gaming devices. The device according to the appended claims may be a stationary-type electronic device. Examples of the stationary-type electronic devices include, but are not limited to, desktop personal computers, automatic teller machines (ATM), and television receivers.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A mobile device, comprising:
a touch screen display; and
a controller configured to
display an interrupted-state icon, which indicates presence of at least one of paused applications which are pausing corresponding processes, among a plurality of icons on a home screen displayed on the touch screen display, said one of paused applications pausing an editing process,
display a list of the paused applications when a first predetermined gesture is performed on the interrupted-state icon while the paused applications are pausing the corresponding processes, and
add a number, which indicates the a number of pieces of information associated with the paused applications, to a mini-icon of the interrupted-state icon,
wherein
the controller is further configured to, in response to a second predetermined gesture, discard the paused application without restarting the editing process.

2. The mobile device according to claim 1, wherein, when a gesture of selecting the paused application is detected through the touch screen display, the controller is configured to resume the editing process of the paused application.

3. The mobile device according to claim 1, wherein the controller is further configured to change, according to an operation performed on one of the paused applications, a handling application to handle edited data of the paused application.

4. A method of controlling a device with a touch screen display, the method comprising:
starting an application which executes an editing process of data;
pausing the editing process of the application;
displaying an interrupted-state icon, which indicates presence of at least one of paused applications pausing corresponding processes and the paused application, among a plurality of icons on a home screen displayed on the touch screen display;
displaying a list of the paused applications when a first predetermined gesture performed on the interrupted-state icon through the touch screen display is detected while the paused applications are pausing the corresponding processes;
adding a number, which indicates a number of pieces of information associated with the paused applications, to a mini-icon of the interrupted-state icon; and
in response to a second predetermined gesture, discarding the paused application without restarting the editing process.

5. A non-transitory storage medium that stores a program for causing, when executed by a device with a touch screen display, the device to execute:
starting an application which executes an editing process of data;
pausing the editing process of the application;
displaying an interrupted-state icon, which indicates presence of at least one of paused applications pausing corresponding processes and the paused application, among a plurality of icons on a home screen displayed on the touch screen display;
displaying a list of the paused applications when a first predetermined gesture performed on the interrupted-state icon through the touch screen display is detected while the paused applications are pausing the corresponding processes;
adding a number, which indicates a number of pieces of information associated with the paused applications, to a mini-icon of the interrupted-state icon; and
in response to a second predetermined gesture, discarding the paused application without restarting the editing process.

6. The mobile device according to claim 1, wherein
the controller is configured to display the interrupted-state icon as the only icon indicating presence of the paused applications on the home screen.

7. The method according to claim 4, wherein
the interrupted-state icon is the only icon indicating presence of the paused applications on the home screen.

8. The non-transitory storage according to claim 5, wherein
the interrupted-state icon is the only icon indicating presence of the paused applications on the home screen.

* * * * *